United States Patent
Faibish et al.

(10) Patent No.: US 9,697,213 B1
(45) Date of Patent: Jul. 4, 2017

(54) CLUSTER FILE SYSTEM COMPRISING OBJECT STORAGE SERVER TIER AND SCALE-OUT NETWORK ATTACHED STORAGE TIER

(71) Applicant: EMC Corporation, Hopkinton, MA (US)

(72) Inventors: Sorin Faibish, Newton, MA (US);
John M. Bent, Los Alamos, NM (US);
Uday Gupta, Westford, MA (US);
James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 606 days.

(21) Appl. No.: 13/915,799

(22) Filed: Jun. 12, 2013

(51) Int. Cl.
G06F 17/30 (2006.01)

(52) U.S. Cl.
CPC .............................. *G06F 17/30079* (2013.01)

(58) Field of Classification Search
CPC .................................................. G06F 17/30079
See application file for complete search history.

(56) References Cited

U.S. PATENT DOCUMENTS

2009/0300079 A1* 12/2009 Shitomi ........................ 707/204
2011/0035548 A1* 2/2011 Kimmel et al. .............. 711/114
2012/0078931 A1* 3/2012 Jaquette ........................ 707/758
2012/0310892 A1* 12/2012 Dam et al. .................... 707/659

OTHER PUBLICATIONS

EMC Corporation, "EMC Isilon Scale-Out Storage Product Family—Storage Made Simple," 2012, 6 pages.
Cluster File Systems, Inc., "Lustre: A Scalable, High-Performance File System," Nov. 2002, 13 pages.
Feiyi Wang et al., "Understanding Lustre Filesystem Internals," Tech Report: ORNL/TM-2009/117, Apr. 2010, 95 pages.
J. Bent et al., "PLFS: A Checkpoint Filesystem for Parallel Applications," ACM/IEEE Conference on High Performance Computing, Networking, Storage and Analysis, SC09, Nov. 2009, 12 pages.

* cited by examiner

*Primary Examiner* — Khanh Pham
(74) *Attorney, Agent, or Firm* — Ryan, Mason & Lewis, LLP (57) ABSTRACT

A cluster file system comprises a metadata server and a plurality of object storage servers each having one or more object storage targets. The object storage servers and their corresponding object storage targets are arranged in a first storage tier of the cluster file system. The cluster file system further comprises a second storage tier that includes a plurality of nodes of a scale-out network attached storage cluster. The cluster file system is configured to control movement of data between the first and second storage tiers. For example, in some embodiments, the object storage servers comprise one or more components of parallel log-structured file system (PLFS) middleware configured to control migration of data between the first and second storage tiers.

22 Claims, 5 Drawing Sheets

CLUSTER FILE SYSTEM COMPRISING OBJECT STORAGE SERVER TIER AND SCALE-OUT NETWORK ATTACHED STORAGE TIER

FIELD

The field relates generally to data storage, and more particularly to parallel file systems and other types of cluster file systems.

BACKGROUND

A cluster file system allows multiple client devices to share access to files over a network. One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

For example, certain types of highly cost effective storage, such as scale-out network attached storage, are often seen as failing to provide performance characteristics that are adequate for use with supercomputers and other complex computing environments that utilize Lustre file systems.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that implement both an object storage server tier and a scale-out network attached storage tier, with efficient movement of data between the tiers, so as to provide significant improvements relative to conventional arrangements. For example, one or more of the illustrative embodiments are configured so as to allow a cluster file system to obtain the performance advantages of a flash storage tier as well as the storage capacity and cost benefits associated with use of scale-out network attached storage. Accordingly, implementation of scale-out network attached storage is facilitated in supercomputers and other complex computing environments that utilize Lustre file systems.

In one embodiment, a cluster file system comprises a metadata server and a plurality of object storage servers each having one or more object storage targets. The object storage servers and their corresponding object storage targets are arranged in a first storage tier of the cluster file system. The cluster file system further comprises a second storage tier that includes a plurality of nodes of a scale-out network attached storage cluster. The cluster file system is configured to control movement of data between the first and second storage tiers. The controlled movement between storage tiers can be implemented in a manner that is at least in part responsive to applications running on clients of the cluster file system.

The object storage servers may comprise one or more components of parallel log-structured file system (PLFS) middleware configured to control migration of data between the first and second storage tiers. For example, a given one of the components of the PLFS middleware implemented in the object storage server may comprise a synchronization daemon that is triggered by at least one of a read operation and a write operation associated with an application running on a client of the cluster file system.

Multiple data files stored on respective ones of the object storage targets may be associated with a single PLFS file for movement from the first storage tier to the second storage tier. The multiple data files associated with a given PLFS file migrated from the first storage tier to the second storage tier may be directly accessible within the second storage tier by a client of the cluster file system without requiring interaction with any of the object storage servers of the first storage tier. Movement of a given PLFS file between the first and second storage tiers may be controlled at least in part based on information provided by an application running on a client of the cluster file system.

As noted above, illustrative embodiments described herein provide significant improvements relative to conventional arrangements. In some of these embodiments, use of a flash storage tier implemented using object storage servers in conjunction with a disk storage tier implemented using nodes of a scale-out network attached storage cluster allows dynamic balancing of storage capacity and IO throughput requirements in a cluster file system, thereby allowing particular levels of performance to be achieved at a significantly lower cost than would otherwise be possible. Similar improvements are provided in alternative embodiments using other numbers and types of storage tiers.

DETAILED DESCRIPTION

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices, as well as combinations of multiple such file systems.

Figure 1:
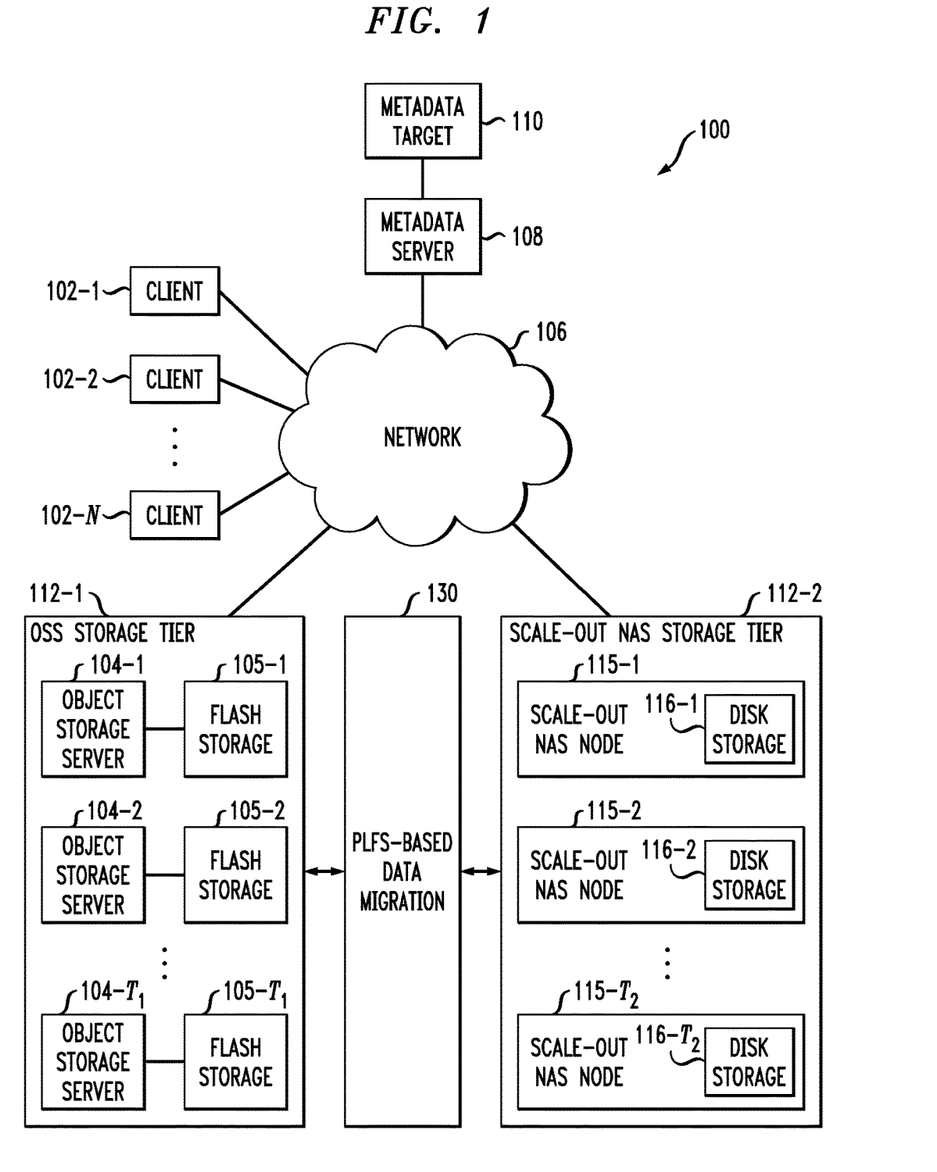
FIG. 1 is a block diagram of a cluster file system having multiple storage tiers including an object storage server tier and a scale-out network attached storage tier in an illustrative embodiment of the invention.

FIG. 1 shows a cluster file system 100 configured in accordance with an illustrative embodiment of the present invention. The cluster file system 100 comprises a plurality of clients 102 and a plurality of object storage servers 104. More particularly, the cluster file system 100 comprises N clients denoted 102-1, 102-2, . . . 102-N, and a first storage tier 112-1 of $T_1$ object storage servers denoted 104-1 through 104-$T_1$. As will be described in more detail below, the cluster file system 100 further comprises at least one additional storage tier, illustratively shown in the figure as a second storage tier 112-2.

Each of the object storage servers 104 of the first storage tier 112-1 has a corresponding storage device 105 which in the present embodiment comprises a flash storage device. Thus, the object storage servers 104-1 through 104-$T_1$ are associated with respective flash storage devices 105-1 through 105-$T_1$. The flash storage devices 105 are examples of object storage targets of the object storage servers 104, and other types of object storage targets may be used in other embodiments. For example, although only a single object storage target is associated with each object storage server 104 in the FIG. 1 embodiment, other embodiments may associate multiple object storage targets with each object storage server. Illustrative arrangements of the latter type will be described below in conjunction with FIGS. 2 and 4.

The clients 102 and the object storage servers 104 communicate with one another over a network 106. Also coupled to the network 106 is a metadata server 108 having an associated metadata target 110. The metadata server 108 is configured to communicate with clients 102 and object storage servers 104 over the network 106. For example, the metadata server 108 may receive metadata requests from the clients 102 over the network 106 and transmit responses to those requests back to the clients over the network 106. The metadata server 108 utilizes its metadata target 110 in processing metadata requests received from the clients 102 over the network 106. The metadata target 110 may comprise a storage array or other type of storage device.

Storage arrays utilized in the cluster file system 100 may comprise, for example, storage products such as VNX and Symmetrix VMAX, both commercially available from EMC Corporation of Hopkinton, Mass. A variety of other storage products may be utilized to implement at least a portion of the object storage targets and metadata target of the cluster file system 100.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

As indicated previously, the object storage servers 104 in the present embodiment are arranged into first storage tier 112-1 of the cluster file system 100. The system 100 illustratively comprises first and second storage tiers 112-1 and 112-2, with the first storage tier 112-1 comprising the object storage servers 104 and their respective flash storage devices 105, and the second storage tier 112-2 comprising a plurality of nodes 115 of a scale-out network attached storage cluster, also denoted herein as a scale-out NAS cluster. More particularly, the second storage tier 112-2 comprises $T_2$ scale-out NAS nodes 115-1 through 115-$T_2$ comprising respective disk storage devices 116-1 through 116-$T_2$.

The scale-out NAS cluster of system 100 and other scale-out NAS clusters referred to herein may be implemented, for example, using Isilon storage platforms, such as storage platforms comprising Isilon platform nodes and associated accelerators in the S-Series, X-Series and NL-Series product lines, commercially available from EMC Corporation of Hopkinton, Mass.

The first and second storage tiers 112-1 and 112-2 are also referred to as an object storage server or OSS storage tier and a scale-out NAS storage tier, respectively. Although there are two storage tiers in this embodiment, it is to be appreciated that more than two storage tiers may be used in other embodiments.

The cluster file system 100 is configured to control movement of data between the first and second storage tiers 112-1 and 112-2. In the present embodiment, this data movement between storage tiers is accomplished at least in part utilizing parallel log-structured file system (PLFS) middleware 130 that is configured to control migration of data between the first and second storage tiers. The use of PLFS facilitates efficient movement of data between the storage tiers in a manner that is at least in part responsive to applications running on clients 102 of the cluster file system 100. The PLFS middleware 130 is also denoted in the figure as providing PLFS-based data migration functionality. The term "data movement" as used herein is intended to be broadly construed, so as to encompass data migration as well as other types of movement of data between storage tiers.

Although illustratively shown as being separate from the storage tiers 112 in the figure, components of the PLFS middleware 130 are assumed to be implemented in the object storage servers 104 as well as in the scale-out NAS nodes 115. For example, each of the storage tiers 112 may be viewed as implementing a virtual layer of PLFS functionality within the cluster file system 100.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that use of PLFS is not a requirement, and other types of middleware or data movement control arrangements can be used in other embodiments.

The different storage tiers 112-1 and 112-2 in this embodiment comprise different types of storage devices having different performance characteristics. As mentioned previously, each of the object storage servers 104 is configured to interface with a corresponding object storage target in the form of a flash storage device 105, and each of the scale-out NAS nodes 115 comprises a disk storage device 116.

The flash storage devices 105 of the first storage tier 112-1 are generally significantly faster in terms of read and write access times than the disk storage devices 116 of the second storage tier 112-2. The flash storage devices are therefore considered "fast" devices in this embodiment relative to the "slow" disk storage devices. Accordingly, the cluster file system 100 may be characterized in the present embodiment as having a "fast" storage tier 112-1 and a "slow" storage tier 112-2, where "fast" and "slow" in this context are relative terms and not intended to denote any particular absolute performance level. However, numerous alternative tiering arrangements may be used, including arrangements with three or more tiers each providing a different level of performance. The particular storage devices used in a given storage tier may be varied in other embodiments, and multiple distinct storage device types may be used within a single storage tier.

The flash storage devices 105 may be implemented, by way of example, using respective flash Peripheral Component Interconnect Express (PCIe) cards or other types of memory cards installed in a computer or other processing device that implements the corresponding object storage server 104. Numerous alternative arrangements are possible. Also, a variety of other types of non-volatile or volatile memory in any combination may be used in place of the flash storage devices 105. Examples of alternatives to flash storage devices that may be used as respective object storage targets in other embodiments of the invention include non-volatile memories such as magnetic random access memory (MRAM) and phase change random access memory (PC-RAM).

The flash storage devices 105 of the first storage tier 112-1 generally provide higher performance than the disk storage devices 116 of the second storage tier 112-2 but the disk storage devices 116 generally provide higher capacity at lower cost than the flash storage devices 105. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the cluster file system 100, leading to enhanced system performance relative to conventional arrangements, while additionally or alternatively providing an ability to achieve particular levels of performance at lower cost.

System elements such as clients 102, object storage servers 104, metadata server 108 and scale-out NAS nodes 115 may be implemented as respective processing devices each comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "computer program products" storing executable computer program code.

A processing device of the type described above will also generally include network interface circuitry. The network interface circuitry allows the processing device to communicate over the network 106 with other processing devices used to implement other system elements. The network interface circuitry may comprise, for example, one or more conventional transceivers.

The PLFS middleware 130 may be implemented in the form of software that is stored in one or more memories and executed by one or more processors within one or more processing devices. Such middleware may be viewed as residing between operating system software and application software on the processing devices.

It should be understood that the particular arrangement of system elements illustrated in FIG. 1 is presented by way of example only, and numerous other arrangements are possible. For example, although only a single metadata server 108 is shown in the FIG. 1 embodiment, a given cluster file system in other embodiments may comprise multiple metadata servers, each having one or more metadata targets.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system. Examples of Lustre file systems configured in accordance with embodiments of the invention will be described below with reference to FIGS. 2, 3 and 4.

Figure 2:
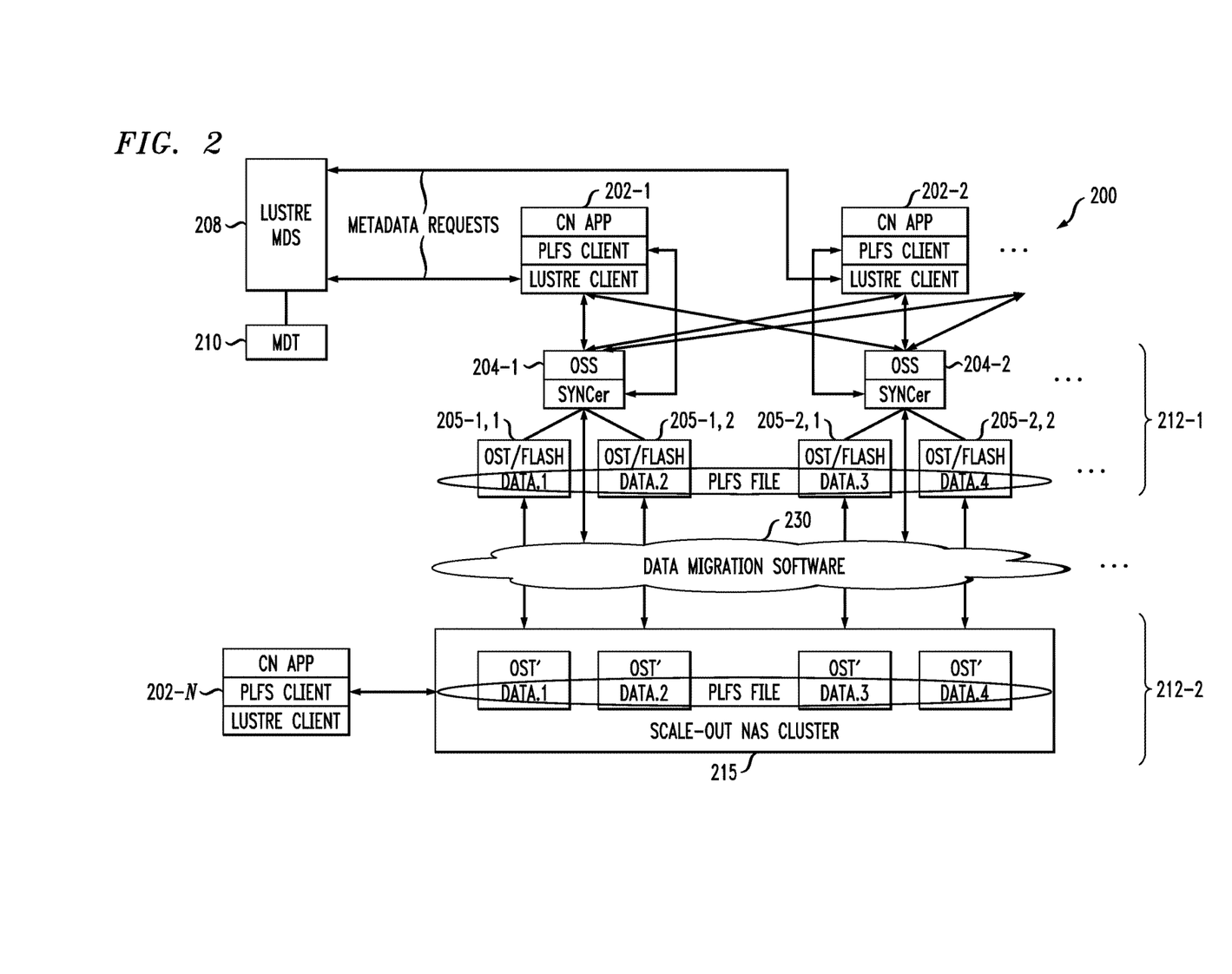
FIGS. 2, 3 and 4 are block diagrams of other illustrative embodiments of cluster file systems each having an object storage server tier and a scale-out network attached storage tier.

As illustrated in FIG. 2, a cluster file system 200 in an embodiment of the invention comprises a plurality of clients 202-1, 202-2, . . . 202-N, a plurality of object storage servers 204, a plurality of object storage targets 205, a metadata server 208, a metadata target 210, and a scale-out NAS cluster 215. The clients 202 are more particularly referred to as compute nodes (CNs) in this embodiment. The object storage servers 204, object storage targets 205, metadata server 208 and metadata target 210 are also denoted in this figure as Lustre OSS, OST, MDS and MDT elements, respectively.

A given OSS 204 exposes multiple OSTs 205 in the present embodiment. Each of the OSTs 105 is assumed to comprise one or more flash storage devices, although other types of storage devices could be used in other embodiments. The scale-out NAS cluster 215 has a plurality of nodes that are illustratively shown as comprising respective OST' components. These OST' components are assumed to comprise respective disk storage devices. The total data storage capacity of the cluster file system 200 is the sum of all the individual data storage capacities represented by the flash OSTs 205 and the corresponding disk storage devices denoted as respective OST' components in the scale-out NAS cluster 215.

The CNs 202 can concurrently access this collective data storage capacity using data IO requests directed to the OSSs 204 based on metadata obtained from the MDS 208. The IO requests and other similar requests herein may be configured, for example, in accordance with standard portable operating system interface (POSIX) system calls.

The MDS 208 utilizes the MDT 210 to provide metadata services for the cluster file system 200. The MDT 210 stores file metadata, such as file names, directory structures, and access permissions.

Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

As indicated previously, it is difficult in conventional Lustre implementations to balance the conflicting requirements of storage capacity and IO throughput. This can lead to situations in which either performance is less than optimal or the costs of implementing the system become excessive.

In the present embodiment, these and other drawbacks of conventional arrangements are addressed by configuring the system 200 to include an OSS storage tier and a scale-out NAS storage tier. These storage tiers are respectively denoted as first and second storage tiers 212-1 and 212-2 in FIG. 2. The cluster file system 200 further comprises data migration software 230 configured to control movement of data between the tiers.

Although shown for simplicity and clarity of illustration as a separate element arranged between the OSSs 204 and the scale-out NAS cluster 215, the data migration software 230 is assumed to be implemented in part within the OSSs 204 and in part within the scale-out NAS cluster 215. Portions of the data migration software 230 may additionally or alternatively be implemented in other system elements. The data migration software 230 is assumed to provide PLFS functionality similar to that described above in the context of PLFS middleware 130. The data migration software 230 may therefore comprise PLFS middleware that resides between operating system software and application software on one or more processing devices of the system 200.

In the first storage tier 212-1, each of the OSSs 204 illustratively has two OSTs 205. Thus, for example, OSS 204-1 has OSTs denoted 205-1,1 and 205-1,2, and OSS 204-2 has OSTs denoted 205-2,1 and 205-2,2. Different numbers and arrangements of OSTs may be used in other embodiments.

In the second storage tier 212-2, there are multiple nodes having respective OST' components corresponding to respective OSTs 205 of the first storage tier. Other embodiments need not have this one-to-one correspondence between the OST and OST' components of the respective first and second storage tiers.

As in the FIG. 1 embodiment, it is assumed that the OST components of the first storage tier 212-1 are "fast" relative to the "slow" OST' components of the second storage tier 212-2. It was noted above that the OST components of the first storage tier 212-1 comprise flash storage devices and the OST' components of the second storage tier 212-2 comprise disk storage devices. It was also noted above that the flash storage devices generally provide higher performance than the disk storage devices but the disk storage devices generally provide higher capacity at lower cost than the flash storage devices.

Each of the CNs 202 of system 200 more particularly comprises a CN application, a PLFS client and a Lustre client as illustrated. The PLFS clients of the CNs 202-1 and 202-2 are shown as interfacing with respective synchronization daemons of the respective OSSs 204-1 and 204-2. The synchronization daemons in this embodiment are more particularly denoted as SYNCer components of the respective OSSs 204-1 and 204-2. These components are examples of PLFS middleware components of the system 200. It is assumed that the synchronization daemons of the OSSs 204-1 and 204-2 are triggered by operations associated with applications running on the CNs 202. These operations may include read or write operations, as well as other types of operations.

The first storage tier 212-1 in the present embodiment illustratively stores multiple data files on respective ones of the OSTs 205 in association with a single PLFS file. The multiple data files that form a single PLFS file in this example are denoted as data.1, data.2, data.3 and data.4. These multiple data files associated with a single PLFS file are subject to migration between the first storage tier 212-1 and the second storage tier 212-2 and accordingly are shown as being stored on respective ones of the OST' components. These OST' components are assumed to be associated with respective nodes of the scale-out NAS cluster 215. Thus, the single PLFS file having associated data files data.1, data.2, data.3 and data.4 is stored in a distributed manner across multiple nodes of the scale-out NAS cluster 215 of the second storage tier 212-2.

After a given PLFS file has been migrated from one of the tiers to the other, it may be deleted from the former tier as appropriate based on application need and other policies implemented in the system, although this particular functionality is not explicitly illustrated in the figure. Movement of the given PLFS file between the first and second storage tiers may be controlled at least in part based on information provided by one or more of the CN applications running on the CNs 202.

The multiple data files associated with a given PLFS file migrated from the first storage tier 212-1 to the second storage tier 212-2 are directly accessible within the second storage tier by the CNs 202 of the system 200 without requiring interaction between a given accessing CN and any of the OSSs 204 of the first storage tier 212-1. This advantageous feature of direct access to the migrated PLFS file is illustrated for CN 202-N in FIG. 2. As shown, the PLFS client implemented within CN 202-N can directly access the PLFS file comprising data files data.1, data.2, data.3 and data.4 as stored on the respective OST' components of the scale-out NAS cluster 215.

The direct access feature described above can be used to facilitate implementation of home directories for the CNs 202 in the scale-out NAS cluster 215. Also, implementation of functionality such as archiving, backups, security and other types of data protection for the CNs is facilitated by providing the CNs 202 with direct access to PLFS files within the nodes of the scale-out NAS cluster 215. The CNs 202 can determine whether to access PLFS files in flash storage via the OSSs 204 or directly on the scale-out NAS cluster 215 based on the particular needs of the applications that are utilizing those files.

In the FIG. 2 embodiment and other Lustre embodiments herein, the OSSs 204 of the Lustre file system utilize flash storage devices 205 to support high performance IO operations. The scale-out NAS cluster 215 may be viewed as providing a back-end "shadow" file system that stores migratable data files for processing by the OSSs while also supporting the above-noted home directory and data protection functions for the CNs 202.

The synchronization components of the OSSs 204 can initiate migration of PLFS files to and from the scale-out NAS cluster 215 responsive to information received from the CN applications via the corresponding PLFS clients implemented on the CNs 202. For example, a given application running on one of the CNs 202 may provide an indication of a particular type of specialized processing for a certain job, such as "fast" or "slow" processing associated with the respective first or second storage tiers 212-1 and 212-2. Such information may be utilized by the data migration software 230 to generate migration requests directing movement of corresponding data between the storage tiers.

In other situations, such as when there is no application information indicating a particular type of specialized processing for a certain job, a policy engine that is part of the data migration software 230 of the system 200 may determine appropriate tiers to be used for the corresponding data. The resulting policy decision is utilized to generate a migration request. For example, the policy engine may implement a policy that specifies that files having a certain request rate will be kept in the flash storage tier even in the absence of any particular application information.

Like the FIG. 1 embodiment, the exemplary tiering arrangement of FIG. 2 makes it possible to dynamically balance the conflicting requirements of storage capacity and IO throughput, thereby avoiding situations in which either performance is less than optimal or the costs of implementing the system become excessive.

Also, such an arrangement allows the cluster file system 200 to obtain the performance advantages of a flash storage tier as well as the storage capacity and cost benefits associated with use of scale-out network attached storage. Accordingly, implementation of scale-out network attached storage is facilitated in supercomputers and other complex computing environments that utilize Lustre file systems.

Figure 3:
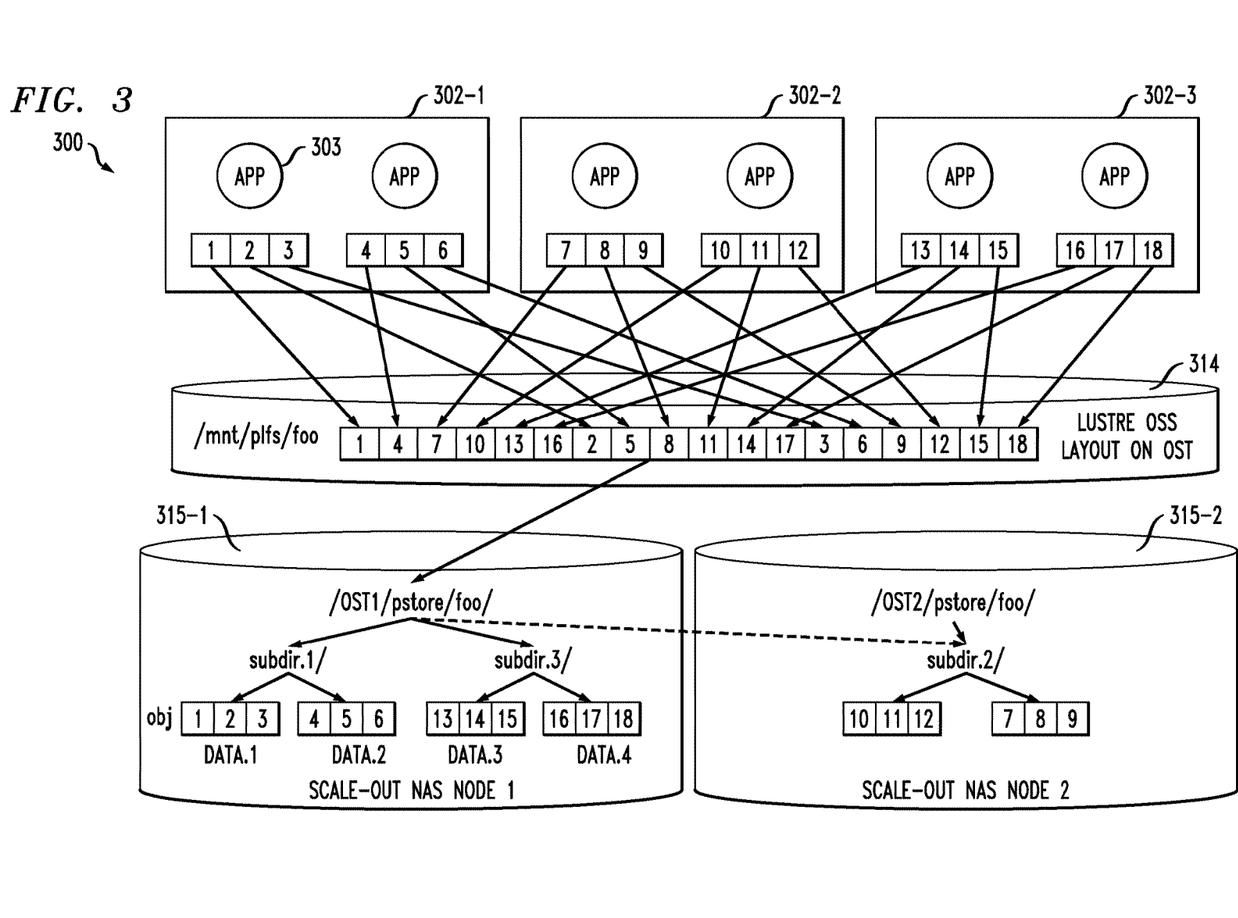

FIG. 3 shows another cluster file system 300 that includes CNs 302-1, 302-2 and 302-3 each including multiple applications 303. The cluster file system 300 comprises an OSS storage tier 314 and a scale-out NAS storage tier comprising first and second scale-out NAS nodes 315-1 and 315-2. The particular numbers of CNs 302 and scale-out NAS nodes 315 are exemplary only and in other embodiments different numbers and arrangements of such elements may be used.

In the FIG. 3 embodiment, as in other embodiments described herein, the OSS storage tier is also referred to as a "fast" storage tier and the scale-out NAS storage tier is also referred to as a "slow" storage tier. Again, the terms "fast" and "slow" in this context are relative terms and should not be construed as requiring any particular absolute performance levels.

The applications 303 on the first CN 302-1 utilize respective sets of data items 1, 2, 3 and 4, 5, 6. Similarly, the applications 303 on the second CN 302-2 utilize respective sets of data items 7, 8, 9 and 10, 11, 12 and the applications 303 on the third CN 302-3 utilize respective sets of data items 13, 14, 15 and 16, 17, 18. Each of the sets of data items is assumed to collectively comprise a corresponding data file. As illustrated in the figure, these data files are collectively stored in accordance with a particular PLFS file layout on the OSTs that are associated with the OSSs of the OSS storage tier 314. The PLFS file in this example is mounted under a file directory denoted /mnt/plfs/foo.

Different portions of the PLFS file are also stored in different subdirectories of respective directories on respective ones of the nodes 315-1 and 315-2 of the scale-out NAS cluster. More particularly, the first node 315-1 of the scale-out NAS cluster has a directory denoted /OST1/pstore/foo/ that corresponds to a first OST of the OSS storage tier 314 and the second node 315-2 of the scale-out NAS cluster has a directory denoted/OST2/pstore/foo/ that corresponds to a second OST of the OSS storage tier 314.

Data files denoted as data.1 and data.2 comprising respective sets of data items 1, 2, 3 and 4, 5, 6 are stored in a subdirectory subdir.1/ of /OST1/pstore/foo/ on node 315-1. Data files denoted as data.3 and data.4 comprising respective sets of data items 13, 14, 15 and 16, 17, 18 are stored in a subdirectory subdir.3/ of /OST1/pstore/foo/ on node 315-1. The remaining data files comprising sets of data items 10, 11, 12 and 7, 8, 9 are stored in a subdirectory subdir.2/ of /OST2/pstore/foo/ on node 315-2.

It should be understood that these particular file and storage arrangements are presented by way of illustrative example only, and should not be construed as limiting in any way.

Migration of data between storage tiers in the system of FIG. 3 may be carried out in a manner similar to that previously described in conjunction with FIGS. 1 and 2.

Figure 4:
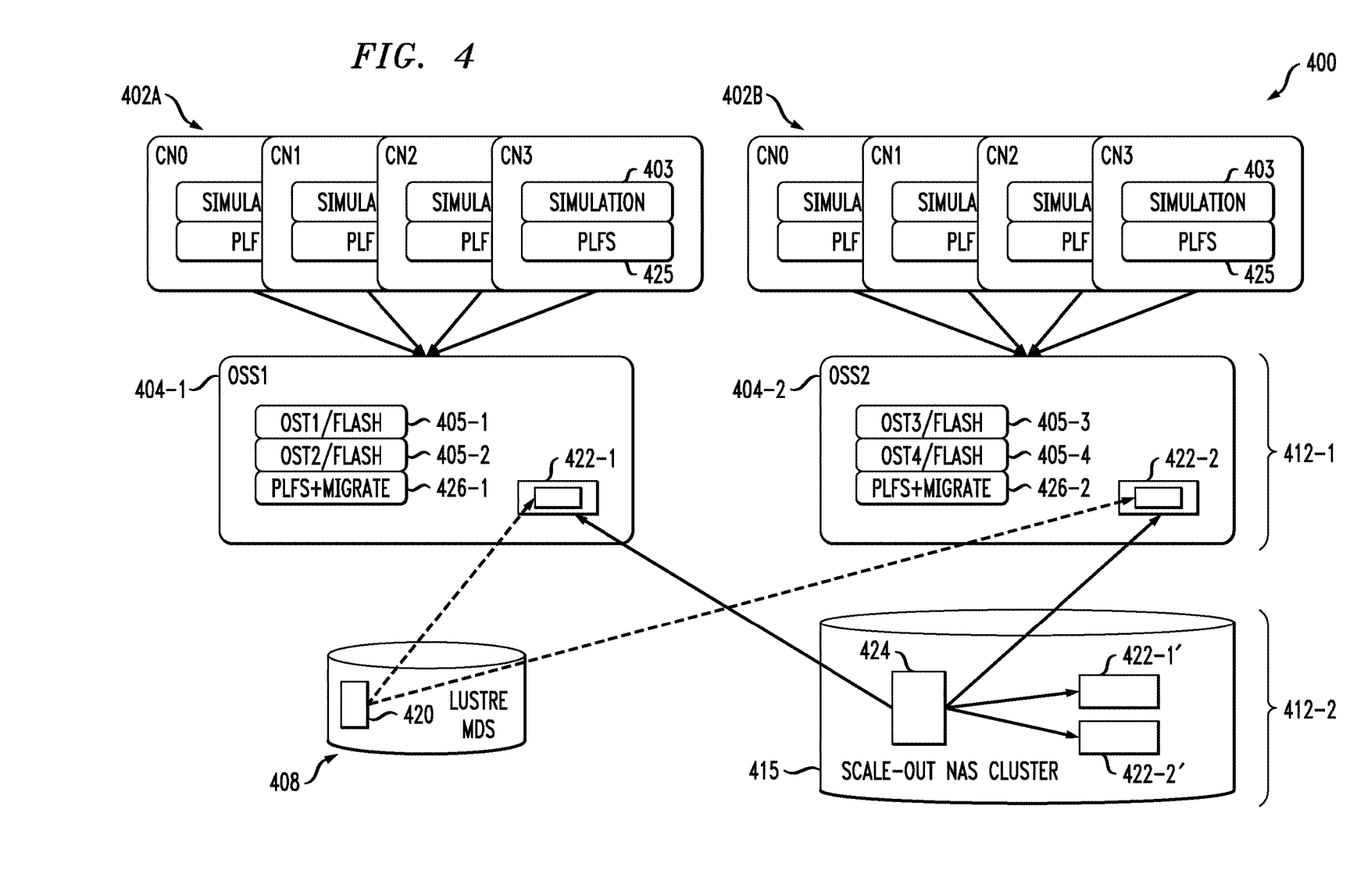

FIG. 4 shows another exemplary cluster file system 400 in an illustrative embodiment. In this embodiment, first and second sets of CNs 402A and 402B are associated with respective OSSs 404-1 and 404-2, also denoted OSS1 and OSS2. The four CNs in each of the sets of CNs 402A and 402B are denoted CN0, CN1, CN2 and CN3. Each of the CNs in this embodiment runs a simulation application 403 as part of a high performance computing function of the system 400.

Each of the OSSs 404-1 and 404-2 is associated with two OSTs comprising respective pairs of flash storage devices 405-1, 405-2 and 405-3, 405-4. The flash OSTs associated with OSS1 are also denoted OST1 and OST2, and the flash OSTs associated with OSS2 are also denoted OST3 and OST4. The OSSs 404 and corresponding OSTs 405 are part of a first storage tier 412-1. Again, other numbers and arrangements of CNs, OSSs and OSTs may be used in other embodiments.

The system 400 further comprises a Lustre MDS component 408 comprising metadata 420 that points to data objects 422-1 and 422-2 stored in respective flash devices associated with respective ones of the OSSs 404-1 and 404-2.

A second storage tier 412-2 of the system 400 comprises a scale-out NAS cluster 415. The scale-out NAS cluster 415 comprises a network file system (NFS) directory 424 that includes data objects 422-1' and 422-2' which correspond to the respective data objects 422-1 and 422-2 stored in the first storage tier 412-1.

The CNs in sets 402A and 402B each include a PLFS client 425. The OSSs 404-1 and 404-2 include respective PLFS middleware components 426-1 and 426-2 that control migration between the storage tiers 412 based at least in part on information received from the PLFS clients 425 of the CNs 402. Upon migration of a given PLFS file to or from one of the storage tiers 412, the metadata 420 and directory 424 may be updated as needed under the control of data migration software of the system 400.

Again, migration of data between storage tiers in the system of FIG. 4 may be carried out in a manner similar to that previously described in conjunction with FIGS. 1 and 2.

It should be noted with regard to the illustrative embodiments of FIGS. 1 through 4 that relatively minor modifications may be made to one or more applications or other system elements or components in order to achieve additional improvements. For example, a job scheduler or other similar component within the system 100, 200, 300 or 400 can also be modified so as to take full advantage of the available storage tiering functionality. Also, some relatively minor modifications may be made to at least a portion of the object storage servers. For example, object storage servers may be optimized for use with the particular storage device type of their corresponding storage tier The exemplary cluster file systems 100, 200, 300 and 400 advantageously obtain the performance advantages of a flash storage tier as well as the storage capacity and cost benefits associated with use of scale-out network attached storage. These embodiments facilitate implementation of scale-out NAS nodes in supercomputers and other complex computing environments that utilize Lustre file systems.

The cluster file systems 100, 200, 300 and 400 or portions thereof as described in conjunction with FIGS. 1 through 4 may be implemented using one or more processing platforms each comprising a plurality of processing devices. Processing modules or other components of these systems may therefore each run on a computer, storage device or other processing platform element. A given such element may be viewed as an example of what is more generally referred to herein as a "processing device."

Figure 5:
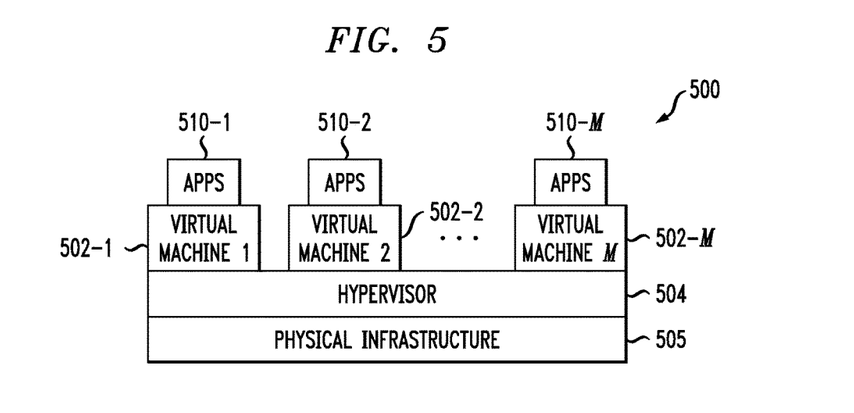
FIGS. 5 and 6 show examples of processing platforms that may be utilized to implement at least a portion of one or more of the cluster file systems of FIGS. 1 through 4.

Referring now to FIG. 5, one possible processing platform that may be used to implement at least a portion of one or more embodiments of the invention comprises cloud infrastructure 500. The cloud infrastructure 500 in this exemplary processing platform comprises virtual machines (VMs) 502-1, 502-2, . . . 502-M implemented using a hypervisor 504. The hypervisor 504 runs on physical infrastructure 505. The cloud infrastructure 500 further comprises sets of applications 510-1, 510-2, . . . 510-M running on respective ones of the virtual machines 502-1, 502-2, . . . 502-M under the control of the hypervisor 504.

The cloud infrastructure 500 may encompass the entire system 100 or only portions of that system, such as one or more of clients 102, object storage servers 104, object storage targets 105, metadata server 108, metadata target 110 and scale-out NAS storage nodes 115. Similar arrangements of cloud infrastructure may be used to implement at least a portion of the systems 200, 300 and 400 of respective FIGS. 2, 3 and 4.

Although only a single hypervisor 504 is shown in the embodiment of FIG. 5, system 100, 200, 300 or 400 may of course include multiple hypervisors each providing a set of virtual machines using at least one underlying physical machine.

An example of a commercially available hypervisor platform that may be used to implement hypervisor 504 and possibly other portions of system 100, 200, 300 or 400 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100, 200, 300 or 400.

Figure 6:
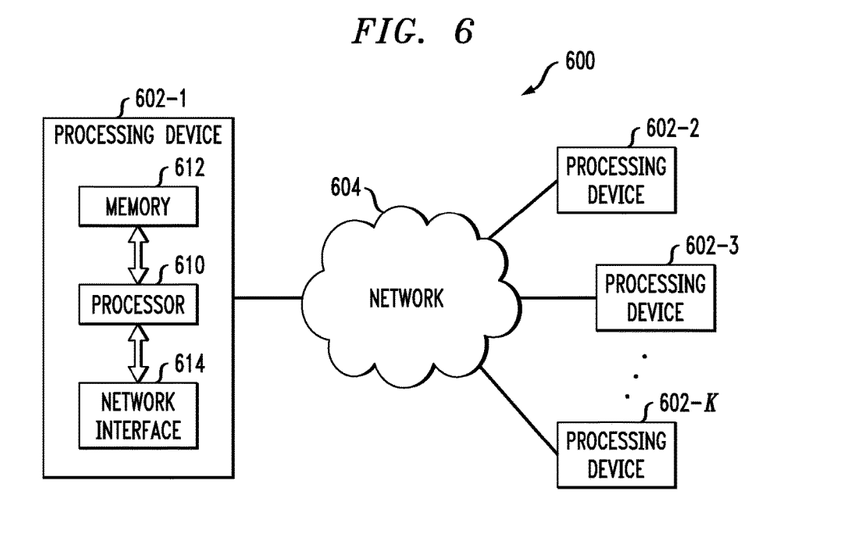

Another example of a processing platform is processing platform 600 shown in FIG. 6. The processing platform 600 in this embodiment comprises at least a portion of one of the systems 100, 200, 300 or 400 and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "computer program product" having executable computer program code embodied therein, may comprise RAM, ROM or other types of memory, in any combination.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100, 200, 300 or 400 may include additional or alternative processing platforms, as well as numerous distinct processing platforms in any combination, with each such platform comprising one or more computers, storage devices or other processing devices.

Multiple elements of system 100, 200, 300 or 400 may be collectively implemented on a common processing platform of the type shown in FIG. 5 or 6, or each such element may be implemented on a separate processing platform.

As indicated above, cluster file system functionality such as that described in conjunction with FIGS. 1 through 4 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from multiple storage tiers including at least one object storage server tier and at least one scale-out NAS tier as described herein. Also, the particular configurations of system and device elements shown in FIGS. 1 through 4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
an object storage server of a cluster file system;
the object storage server being configured to interface with one or more object storage targets;
wherein the object storage server is adapted for inclusion as one of a plurality of object storage servers forming a first storage tier of the cluster file system;
the cluster file system further comprising a second storage tier;
the second storage tier comprising a plurality of nodes of a scale-out network attached storage cluster;
wherein the object storage server is further adapted for communication with one or more of the nodes of the scale-out network attached storage cluster of the second storage tier;
wherein the object storage server comprises one or more components of file system middleware configured to control migration of data between the first and second storage tiers;
wherein multiple data files stored on respective ones of the object storage targets are associated with a single middleware file for movement from the first storage tier to the second storage tier; and
wherein the object storage server is implemented utilizing at least one processing device comprising a processor coupled to a memory.

2. The apparatus of claim 1 wherein the object storage server is further configured to communicate with a plurality of clients over a network.

3. The apparatus of claim 1 wherein the file system middleware comprises parallel log-structured file system (PLFS) middleware and the single middleware file comprises a PLFS file.

4. The apparatus of claim 1 wherein a given one of the components of the file system middleware implemented in the object storage server comprises a synchronization daemon.

5. The apparatus of claim 4 wherein the synchronization daemon is triggered by at least one of a read operation and a write operation associated with an application running on a client of the cluster file system.

6. The apparatus of claim 1 wherein the multiple data files associated with the single middleware file migrated from the first storage tier to the second storage tier are directly accessible within the second storage tier by a client of the cluster file system without requiring interaction with any of the object storage servers of the first storage tier.

7. The apparatus of claim 1 wherein movement of the single middleware file between the first and second storage tiers is controlled at least in part based on information provided by an application running on a client of the cluster file system.

8. The apparatus of claim 1 wherein the single middleware file associated with the first storage tier is migrated for storage in a distributed manner across multiple nodes of the scale-out network attached storage cluster of the second storage tier.

9. The apparatus of claim 8 wherein different portions of the single middleware file are stored in different subdirectories of a plurality of directories on respective ones of the nodes of the scale-out network attached storage cluster.

10. The apparatus of claim 1 wherein at least a portion of data migration software controlling movement of data between the first and second storage tiers of the cluster file system is stored in said memory and executed by said processor.

11. The apparatus of claim 1 wherein said one or more object storage targets comprise respective non-volatile electronic storage devices including one or more of flash, magnetic random access memory (MRAM) and phase change random access memory (PC-RAM).

12. The apparatus of claim 1 wherein the nodes of the scale-out network attached storage cluster of the second storage tier comprise respective disk storage devices.

13. A processing platform comprising the apparatus of claim 1.

14. The apparatus of claim 1 wherein the cluster file system further comprises a metadata server having at least one associated metadata target, the metadata target storing metadata pointing to data objects stored in respective object storage targets of object storage servers in the first storage tier.

15. A method comprising:
configuring a first storage tier of a cluster file system to include a plurality of object storage servers;
configuring a second storage tier of the cluster file system to include a plurality of nodes of a scale-out network attached storage cluster; and
controlling movement of data between the first and second storage tiers utilizing one or more components of file system middleware implemented on at least one of the plurality of object storage servers;
wherein controlling movement of data between the first and second storage tiers comprises associating multiple data files stored on one or more object storage targets of respective ones of the object storage servers with a single middleware file.

16. The method of claim 15 wherein the file system middleware comprises parallel log-structured file system (PLFS) middleware and the single middleware file comprises a PLFS file.

17. The method of claim 15 wherein controlling movement of data between the first and second storage tiers comprises controlling movement of the single middleware file between the first and second storage tiers at least in part based on information provided by an application running on a client of the cluster file system.

18. A computer program product comprising a non-transitory processor-readable storage medium having encoded therein executable code of one or more software programs, wherein the one or more software programs when executed on one or more processing platforms cause the method of claim 15 to be performed.

19. The method of claim 15 wherein:
the single middleware file associated with the first storage tier is migrated for storage in a distributed manner across multiple nodes of the scale-out network attached storage cluster of the second storage tier; and
different portions of the single middleware file are stored in different subdirectories of a plurality of directories on respective ones of the nodes of the scale-out network attached storage cluster.

20. A cluster file system comprising:
a metadata server; and
a plurality of object storage servers;
wherein the plurality of object storage servers are arranged in a first storage tier of the cluster file system;
the cluster file system further comprising a second storage tier;
the second storage tier comprising a plurality of nodes of a scale-out network attached storage cluster;
wherein the cluster file system is configured to control movement of data between the first and second storage tiers; and
wherein at least one of the object storage servers comprises one or more components of file system middleware configured to control migration of data between the first and second storage tiers;
wherein multiple data files stored on respective ones of the object storage targets are associated with a single middleware file for movement from the first storage tier to the second storage tier; and
wherein said at least one object storage server is implemented utilizing at least one processing device comprising a processor coupled to a memory.

21. The system of claim 20 wherein the cluster file system comprises at least one of a distributed file system and a parallel file system.

22. The system of claim 20 wherein:
the single middleware file associated with the first storage tier is migrated for storage in a distributed manner across multiple nodes of the scale-out network attached storage cluster of the second storage tier; and
different portions of the single middleware file are stored in different subdirectories of a plurality of directories on respective ones of the nodes of the scale-out network attached storage cluster.

* * * * *